United States Patent
Park et al.

(10) Patent No.: US 8,842,413 B2
(45) Date of Patent: Sep. 23, 2014

(54) MULTILAYERED CERAMIC ELECTRONIC COMPONENT

(75) Inventors: Myung Jun Park, Chungcheongbuk-do (KR); Da Young Choi, Gyunggi-do (KR); Byong Gyun Kim, Gyunggi-do (KR); Ji Sook Kim, Seoul (KR); Byung Jun Jeon, Seoul (KR); Hyun Hee Gu, Gyunggi-do (KR); Kyu Ha Lee, Gyunggi-do (KR); Gun Jung Yoon, Seoul (KR); Eun Sang Na, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 123 days.

(21) Appl. No.: 13/353,010

(22) Filed: Jan. 18, 2012

(65) Prior Publication Data

US 2012/0295122 A1   Nov. 22, 2012

(30) Foreign Application Priority Data

May 20, 2011   (KR) .................... 10-2011-0047696

(51) Int. Cl.
*H01G 4/06* (2006.01)
*C03C 3/00* (2006.01)

(52) U.S. Cl.
CPC .......................... *C03C 3/00* (2013.01)
USPC ............... 361/309; 361/306.3; 361/308.1; 361/310; 361/321.3

(58) Field of Classification Search
CPC ....... H01G 4/008; H01G 4/0085; H01G 4/01; H01G 4/012; H01G 4/252; H01G 4/232
USPC ............... 361/308.1, 306, 3, 309, 306.3, 310, 361/321.3
See application file for complete search history.

(56) References Cited

U.S. PATENT DOCUMENTS

| | | | | |
|---|---|---|---|---|
| 5,536,293 A | * | 7/1996 | Yamamoto et al. | 75/255 |
| 5,712,758 A | * | 1/1998 | Amano et al. | 361/321.2 |
| 5,835,339 A | * | 11/1998 | Sakamoto et al. | 361/321.2 |
| 6,295,196 B1 | * | 9/2001 | Hamaji et al. | 361/321.2 |
| 6,627,120 B2 | * | 9/2003 | Shimizu | 252/521.2 |
| 6,663,798 B2 | * | 12/2003 | Sato et al. | 252/512 |
| 7,079,374 B1 | * | 7/2006 | Kim et al. | 361/321.4 |
| 7,339,780 B2 | * | 3/2008 | Sridharan et al. | 361/306.1 |
| 7,589,954 B2 | * | 9/2009 | Kusano et al. | 361/321.4 |
| 7,691,762 B2 | * | 4/2010 | Sohn et al. | 501/21 |

FOREIGN PATENT DOCUMENTS

| | | |
|---|---|---|
| JP | 06-349313 A | 12/1994 |
| JP | 2002-203737 A | 7/2002 |
| JP | 2008-130720 A | 6/2008 |
| KR | 10-2006-0096014 A | 9/2006 |

OTHER PUBLICATIONS

Notice of Office Action Japanese Patent Application No. 2012-005880 dated Jul. 1, 2014 with English translation.

* cited by examiner

*Primary Examiner* — Cathy Lam
(74) *Attorney, Agent, or Firm* — McDermott Will & Emery LLP (57) ABSTRACT

There is provided a multilayered ceramic electronic component having a reduced thickness and exhibiting hermetic sealing. In multilayered ceramic electronic component, an external electrode includes two layers, that is, first and second layers, and the first and second layers contain glass with different compositions, respectively. Therefore, the multilayered ceramic electronic component having high reliability, such as strong adhesion between the external electrode and the internal electrode, prevention of glass exudation, or the like, may be obtained.

5 Claims, 4 Drawing Sheets

MULTILAYERED CERAMIC ELECTRONIC COMPONENT

CROSS-REFERENCE TO RELATED APPLICATIONS

This application claims priority under 35 U.S.C. §119 to Korean Patent Application No. 10-2011-0047696 filed on May 20, 2011, in the Korean Intellectual Property Office, the disclosure of which is incorporated herein by reference in its entirety.

BACKGROUND OF THE INVENTION

1. Field of the Invention

The present invention relates to a multilayered ceramic electronic component and, more particularly, to a multilayered ceramic electronic component capable of realizing a reduction in thickness and high reliability (hermetic sealing).

2. Description of the Related Art

An existing multilayered ceramic capacitor (MLCC) having a nickel based internal electrode may generally use copper (Cu) as a base metal for an external electrode and may further include glass.

In an external electrode paste, glass may promote copper sintering and, in addition, may serve as an adhesive to combine the external electrode with a ceramic sintered body, and fill voids, not charged with Cu, thereby completely sealing the voids.

In general, the external electrode paste includes one, two or three types of glass. However, in consideration of typical glass characteristics, in the case in which glass has excellent acid-resistance or favorable capacity contact properties, the glass also has a high softening point, in turn causing degradation in Cu wettability. On the other hand, glass with excellent Cu wettability may exhibit low acid-resistance or weak capacity contact.

A Cu-based external electrode paste in the related art may be prepared by applying a Cu paste containing a single type of glass, or two or three different types of glass, to an external electrode and then drying and calcining the coated electrode, resulting in a final product, that is, a Cu-based external electrode. When a single application or calcination described above is adopted, the glass contained in the Cu paste may have difficulties in satisfying requirements such as adhesiveness between internal electrode and external electrode, sealing of the external electrode, Cu wettability, acid resistance, or the like.

That is, in a case in which a content of silicon oxide, among glass ingredients in the Cu paste, is increased, acid resistance becomes excellent but Cu wettability is degraded and a softening point becomes higher. As a result, the glass may not sufficiently fill an interface and a void in Cu metal.

In contrast, in a case in which a content of silicon oxide decrease, Cu wettability of glass and/or glass transfer to the interface may be sufficiently attained, but movement of the glass toward the interface is too rapid and, therefore, a Cu—Ni alloy may rarely be formed.

Moreover, lack of Cu wettability may cause exudation of the glass on the surface of the electrode after calcination of the electrode.

In order to overcome difficulties in the related art described above, an external electrode paste may be prepared by including two or three types of glass that can solve the above problems. However, in order for respective types of glass to successfully achieve desired functions, they need to be located at a desired position in the external electrode. However, due to the high temperature characteristics of glass, it is difficult to locate the glass at a desired position in external electrode.

SUMMARY OF THE INVENTION

An aspect of the present invention provides a multilayered ceramic electronic component having reduced thickness and embodying hermetic sealing.

According to an aspect of the present invention, there is provided A multilayered ceramic electronic component, including: a body formed by alternately laminating a ceramic layer and an internal electrode layer; and an external electrode provided on one surface of the body, wherein the external electrode includes: a first layer formed on one surface of the body to contact the internal electrode and containing a conductive metal and a first glass frit represented by a formula of $aSiO_2\text{-}bB_2O_3\text{-}cAEMO$ (where, $a+b+c=100$, 'a' ranges from 20 to 60, 'b' ranges from 5 to 40, 'c' ranges from 1 to 30, in terms of parts by mole, and AEM denotes an alkali-earth metal selected from a group consisting of barium and calcium); and a second layer formed on the first layer, having a plated layer formed on a surface thereof, and containing a conductive metal and a second glass frit represented by a formula of $aSiO_2\text{-}bB_2O_3\text{-}cAEMO$ (where, $a+b+c=100$, 'a' ranges from 5 to 19, 'b' ranges from 10 to 40, 'c' ranges from 5 to 40, in terms of parts by mole, and AEM denotes an alkali-earth metal selected from a group consisting of barium and calcium).

The first glass frit may further include at least one selected from a group consisting of 10 parts by mole or less of $Al_2O_3$, 30 parts by mole or less of $TM_xO_y$, and 40 parts by mole or less of $AM_2O$ (where, TM is at least one transition metal selected from a group consisting of vanadium and zinc, x and y are atomic ratios of the at least one transition metal and oxygen in a transition metal oxide, AM is an alkaline metal selected from a group consisting of lithium, sodium and potassium, and the second glass frit may further include at least one selected from a group consisting of 10 parts by mole or less of $Al_2O_3$, 10 parts by mole or less of $TM_xO_y$, and 20 parts by mole or less of $AM_2O$ (where, TM is at least one transition metal selected from a group consisting of vanadium and zinc, x and y are atomic ratios of the at least one transition metal and oxygen in a transition metal oxide, and AM is an alkaline metal selected from a group consisting of lithium, sodium and potassium).

The first layer may be formed of a conductive paste including 100 parts by weight of the conductive metal and 5 to 15 parts by weight of the first glass frit and the second layer may be formed of a conductive paste including 100 parts by weight of the conductive metal and 10 to 20 parts by weight of the second glass frit.

The conductive metal may be copper (Cu).
The ceramic layer may be a dielectric layer.
The internal electrode may be made of nickel (Ni).

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of the present invention will be described in detail with reference to accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and sizes of components are exaggerated for clarity. The same or equivalent elements are referred to by the same reference numerals throughout the specification.

A multilayered ceramic electronic component according to an embodiment of the present invention may include a body formed by alternately laminating a ceramic layer and an internal electrode layer; and an external electrode provided on one surface of the body, and the external electrode may include a first layer formed on one surface of the body so as to contact the internal electrode and containing a conductive material and a first glass frit represented by a formula of $aSiO_2$-$bB_2O_3$-$cAEMO$ (where, a+b+c=100, 'a' ranges from 20 to 60, 'b' ranges from 5 to 40, 'c' ranges from 1 to 30, in terms of parts by mole, and AEM denotes an alkali-earth metal selected from a group consisting of barium and calcium); and a second layer formed on the first layer, having a plating layer formed on a surface thereof, and containing a conductive metal and a second glass frit represented by a formula of $aSiO_2$-$bB_2O_3$-$cAEMO$ (where, a+b+c=100, 'a' ranges from 5 to 19, 'b' ranges from 10 to 40, 'c' ranges from 5 to 40, in terms of parts by mole, and AEM denotes an alkali-earth metal selected from a group consisting of barium and calcium).

The first glass frit may further include at least one selected from a group consisting of 10 parts by mole or less of $Al_2O_3$, 30 parts by mole or less of $TM_xO_y$, and 40 parts by mole or less of $AM_2O$ (where, TM is at least one transition metal selected from a group consisting of vanadium and zinc, x and y are atomic ratios of the transition metal and oxygen in a transition metal oxide, AM is an alkaline metal selected from a group consisting of lithium, sodium and potassium). Likewise, the second glass frit may further include at least one selected from a group consisting of 10 parts by mole or less of $Al_2O_3$, 10 parts by mole or less of $TM_xO_y$, and 20 parts by mole or less of $AM_2O$ (where, TM is at least one transition metal selected from a group consisting of vanadium and zinc, x and y are atomic ratios of the transition metal and oxygen in a transition metal oxide, and AM is an alkaline metal selected from a group consisting of lithium, sodium and potassium).

Hereinafter, a multilayered ceramic electronic component according to an embodiment of the present invention will be described in detail with reference to FIGS. 1A and 1B. Examples of the multilayered ceramic electronic component may include; a multilayered ceramic capacitor, a multilayered chip inductor, chip beads, or the like. In the embodiment of the present invention, the multilayered ceramic capacitor may be exemplified. However, the present invention is not limited thereto.

Figure 1A:
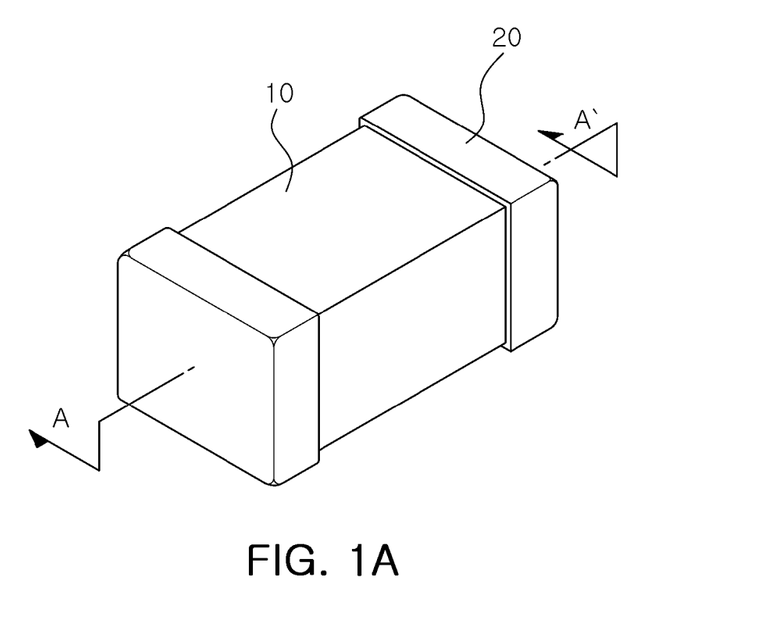
FIGS. 1A and 1B illustrate a perspective view and a cross-sectional view of a multilayered ceramic electronic component according to an embodiment of the present invention, taken along line A-A'.
Figure 1B:
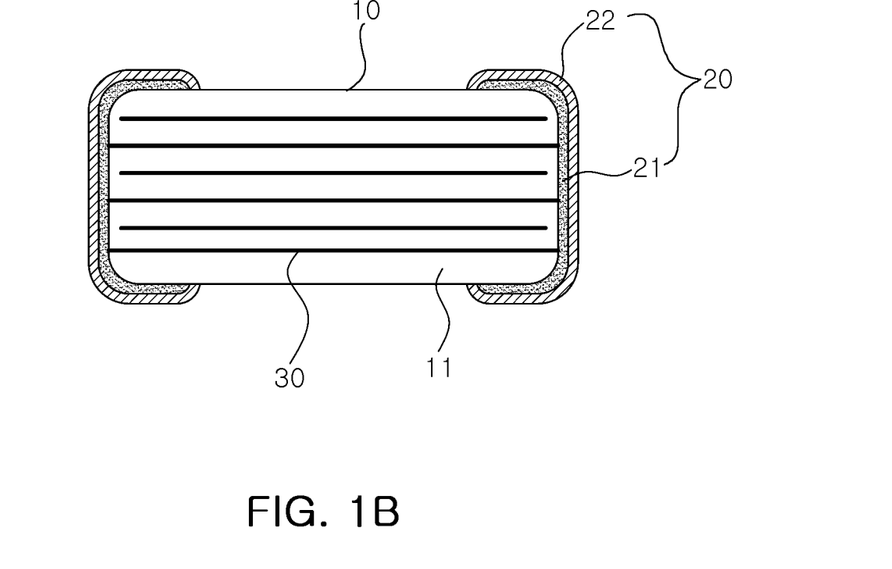

FIGS. 1A and 1B illustrate a perspective view and a cross-sectional view of a multilayered ceramic electronic component according to an embodiment of the present invention, taken along line A-A'.

Referring to FIG. 1B, the multilayered ceramic capacitor is provided with an external electrode 20, the external electrode 20 being formed of two layers.

That is, the external electrode 20 may have a first layer 21 formed on a body 10 and a second layer 22 formed on the first layer 21.

The external electrode 20 is generally formed such that an internal electrode 30 contacts the inside of the external electrode 20 while a plating layer (not shown) is formed on the outside of the external electrode. Therefore, the external electrode may have adhesiveness to the internal electrode and may need to have resistance to a plating solution.

In general, the internal electrode 30 may be made of nickel (hereinafter, 'Ni') as a main material while the external electrode 20 may be made of copper (hereinafter, 'Cu') as a main material. When adding glass to an external electrode paste, Cu present in the external electrode 20 may easily move toward the internal electrode 30 due to fluidity in the glass. The Cu moving toward the internal electrode 30 may contact with Ni, a component constituting the internal electrode 30 and may be subjected to sintering to thereby form a Cu—Ni alloy. In this manner, the formation of Cu—Ni alloy may make electrical connection between the external electrode 20 and the internal electrode 30.

The first layer 21 may be formed to realize the above characteristics.

Meanwhile, when glass has excellent Cu wettability, the glass may be uniformly distributed within the external electrode 20 and in this case, the formation of a tin (Sn) plated layer may be facilitated.

Glass having excellent Cu wettability refers to glass uniformly distributed throughout the external electrode 20 without agglomeration or separation of glass in the external electrode 20 to thereby prevent exudation of the glass on the surface of the external electrode 20.

When glass has poor Cu wettability, glass is not uniformly mixed and combined with Cu, the main material of the external electrode 20 and glass particles tend to agglomerate together to thus cause glass exudation on the surface of the external electrode. Consequently, the formation of a Sn plating layer (not shown) may be difficult.

In order to attain the characteristics described above, the second layer 22 may be formed on the first layer 21, whereby a two-layer structure of an external electrode may be designed.

With the tendency for miniaturization and high capacity in electronic products, a thickness of an external electrode has been decreased. Accordingly, a plating solution may permeate into the external electrode during a plating process after the firing of the external electrode, thereby causing degradation in chip reliability.

Since glass present in the external electrode does not have excellent corrosion resistance to a plating solution, the plating solution may erode the glass and permeate (or penetrate) into the external electrode. Accordingly, penetration of the plating solution into the external electrode possibly caused during plating may be prevented by reinforcing corrosion resistance of the glass included in the external electrode with respect to the plating solution, thereby improving chip reliability.

The first layer of the external electrode may include a first glass frit, while the second layer may include a second glass frit.

The first glass frit may be represented by a formula of $aSiO_2$-$bB_2O_3$-cAEMO (where, a+b+c=100, 'a' ranges from 20 to 60, 'b' ranges from 5 to 40, 'c' ranges from 1 to 30, in terms of parts by mole, and AEM denotes an alkali-earth metal selected from a group consisting of barium and calcium), and may further include at least one selected from a group consisting of 10 parts by mole or less of $Al_2O_3$, 30 parts by mole or less of $TM_xO_y$, and 40 parts by mole or less of $AM_2O$ (where, TM is at least one transition metal selected from a group consisting of vanadium and zinc, x and y are atomic ratios of the transition metal and oxygen in a transition metal oxide, and AM is an alkaline metal selected from a group consisting of lithium, sodium and potassium).

The second glass frit may be represented by a formula of $aSiO_2$-$bB_2O_3$-cAEMO (where, a+b+c=100, 'a' ranges from 5 to 19, 'b' ranges from 10 to 40, 'c' ranges from 5 to 40, in terms of parts by mole, and AEM denotes an alkali-earth metal selected from a group consisting of barium and calcium), and may further include at least one selected from a group consisting of 10 parts by mole or less of $Al_2O_3$, 10 parts by mole or less of $TM_xO_y$, and 20 parts by mole or less of $AM_2O$ (where, TM is at least one transition metal selected from a group consisting of vanadium and zinc, x and y are atomic ratios of the transition metal and oxygen in a transition metal oxide, and AM is an alkaline metal selected from a group consisting of lithium, sodium and potassium).

Hereinafter, constitutional materials of the glass frits will be described in detail.

Individual constitutional materials of a glass frit are combined to form a composite, that is, the glass frit, and express unique characteristics thereof.

That is, although any one among such constitutional materials may be contained in a small or large amount, physical properties of the glass frit may be varied due to the other constitutional materials.

Accordingly, it should be noted that the prediction and/or the comparison of overall physical properties between glass frits by simply comparing constitutional material contents may not be preferable.

Silicon oxide is a glass network former and has a structure in which a silicon atom is surrounded by four oxygen atoms and is coupled to four adjacent silicon atoms.

Silicon oxide may act as the most significant factor to determine a softening point and acid resistance of glass. When a content of silicon oxide is low, a glass network is weak, thus decreasing the softening point and degrading acid resistance. When a content of silicon oxide is high, a glass network is strong, thus increasing the softening point and improving acid resistance.

The content of the first glass frit may be 20 to 60 parts by mole of silicon oxide while the content of the second glass frit may be 5 to 19 parts by mole of silicon oxide.

Silicon oxide may improve corrosion resistance to a plating solution. When a content of silicon oxide is low, an improvement in corrosion resistance to a plating solution may be very slight. When a content of silicon oxide is high, Cu wettability of the glass frit may be degraded.

Boron oxide is a glass network former and may improve corrosion resistance to a plating solution.

The first glass frit may include 5 to 40 parts by mole of boron oxide while the second glass frit may include 10 to 40 parts by mole of boron oxide.

When a content of boron oxide is low, an improvement in corrosion resistance to a plating solution may be very slight. When a content of silicon oxide is high, wettability of the glass frit to Cu as an ingredient of the external electrode may be degraded.

Among alkali-earth metal oxides, barium oxide may most greatly decrease a softening point and melting point of glass, and specifically, leads to an elongation of glass (referred to as 'long-glass') (i.e., a smooth variation in viscosity at high temperatures), thus enhancing workability at high temperatures.

The first glass frit may include 1 to 30 parts by mole of barium oxide while the second glass frit may include 5 to 40 parts by mole of barium oxide.

When a content of barium oxide is low, a melting point and softening point of glass may be increased. When a content of barium oxide is high, the formation of glass may be difficult or chemical durability thereof may be degraded.

Calcium oxide is the most important alkali-earth metal oxide in the manufacturing of glass and may influence the viscosity of a glass melt, improve chemical durability, and broaden the range of working temperature according to the elongation of glass (referred to as 'long-glass').

When a content of calcium oxide is low, viscosity of the glass melt may be excessively decreased. When a content of calcium oxide is high, viscosity of the glass melt may be increased.

According to the embodiment, the glass frit may further include aluminum oxide, a transition metal oxide and/or an alkali-metal oxide.

Aluminum oxide may be classified as an intermediate oxide according to the magnitude of an oxygen bonding force of a cation in the network structure of glass. Specifically, aluminum oxide is known as a component widely used to stabilize a structure of glass. Aluminum oxide may enable the elongation of glass (referred to as 'long-glass'), that is, aluminum oxide may broaden the range of working temperature, and function to increase chemical durability while preventing crystallization.

Each of the first and second glass frits may further include 10 parts by weight or less of aluminum oxide.

When a content of aluminum oxide is high, the crystallization of glass may be generated and the formation of glass may be difficult or a softening point and melting point may be rapidly increased. When a content of aluminum oxide is low, viscosity of glass may be excessively increased while chemical durability thereof may be degraded.

As the transition metal, zinc, vanadium, or the like may be used alone or in a combination of two or more thereof.

In addition, x and y may have a wide range of values depending upon the oxidation number of the transition metal.

The first glass frit may include 30 parts by mole or less of a transition metal oxide while the second glass frit may include 10 parts by mole or less of a transition metal oxide.

Specifically, zinc oxide may serve to decrease a melting point and softening point of glass, and act as a reductive agent to improve a contact between Ni and Cu.

When a content of zinc oxide is high, crystallization of glass may be generated and thus thermal properties of glass may be modified. Moreover, the formation of glass may be difficult or chemical durability thereof may be degraded.

As the alkaline metal, lithium, sodium, potassium, or the like, may be used alone or in a combination of two or more thereof.

The first glass frit may include 40 parts by mole or less of alkali-metal oxide while the second glass frit may include 20 parts by mole or less of alkali-metal oxide.

Alkali-metal oxide is a glass network modifier and serves as a flux to cut a network of silicon oxide, thus increasing fusion extent. Alkali-metal oxide may be introduced in the manufacturing of glass as a flux, so as to cut a strong network bonding in the glass network structure, thus weakening overall network structure. Therefore, although alkali-metal oxide is very effective in decreasing a softening point or melting point, it may also degrade chemical durability.

When a content of alkali-metal oxide is low, it may not sufficiently act as flux. When a content of alkali-metal oxide is high, chemical durability may be degraded.

The glass frit may be prepared as follows.

To satisfy a composition of the first or second glass frit, raw materials are weighted and mixed together. A process of mixing the raw materials is not particularly limited.

After fusing the raw material mixture, the mixture is chilled (rapidly cooled) to prepare glass flakes. The fusion of the raw material mixture may be executed in a common electric furnace at 1400 to 1450° C.

The glass flakes are subjected to dry milling and then wet milling. If the dry milling and wet milling are sequentially conducted, a milling time and a deviation in particle size may be decreased.

Milling may be implemented using a ball mill or the like, to thereby attain the glass frit.

The first layer of the external electrode may be formed of a conductive paste containing 100 parts by weight of the conductive metal described above and 5 to 15 parts by weight of the first glass frit.

When a content of the glass frit is 5 parts by weight or less, a reliability fault may caused due to a decrease in density (compactness) and an absence of glass in an interface between the body (ceramic body) and the external electrode. When a content of the glass frit is parts by weight or more, the glass may move excessively toward the interface between the body (ceramic body) and the external electrode to prevent Cu—Ni contact, thus causing a fault in capacity contact.

The second layer of the external electrode may be formed of a conductive paste containing 100 parts by weight of the conductive metal described above and 10 to 20 parts by weight of the second glass frit.

When a content of the glass is less than 10 parts by weight, a reliability fault may occur due to a decrease in density (compactness). When a content of the glass exceeds 20 parts by weight, the excessive content of glass may cause the glass to move toward the surface of the external electrode, thus causing soldering fault.

The conductive paste may further include a binder and a solvent, as in pastes according to the related art. The binder may include, for example, ethylcelluose, nitrocellulose, acrylic resin, or the like. If necessary, a dispersing agent and/or an active agent may be further included.

The conductive metal may include, but is not limited to, copper (Cu).

A ceramic layer 11 may be a dielectric layer.

The dielectric layer may be formed by mixing a barium titanate-based dielectric material with an organic binder and then treating the mixture by a doctor blade process or rib casting.

The internal electrode 30 may be made of Ni.

The internal electrode 30 may include silver, palladium, platinum, silver-palladium alloy, or the like and, in consideration of economical benefits, Ni or Cu is recently used. Such an internal electrode is generally formed by screen printing and, in order to form the internal electrode through screen printing, the internal electrode may be prepared in a paste form.

Figure 2A:
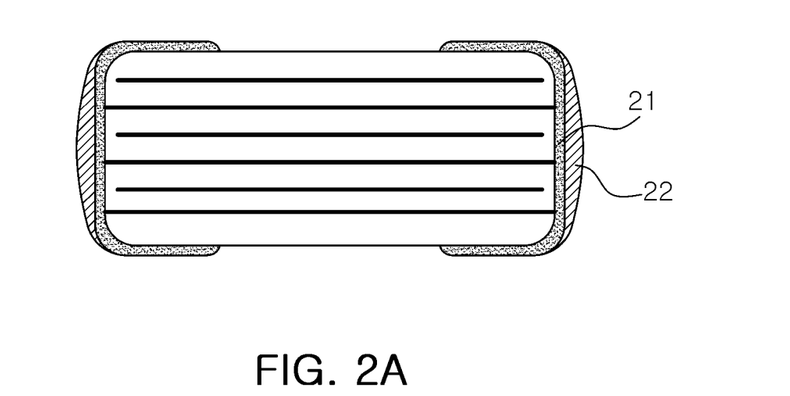
FIGS. 2A and 2B illustrate views, respectively illustrating a configuration of an external electrode of a multilayered ceramic electronic component according to an embodiment of the present invention.
Figure 2B:
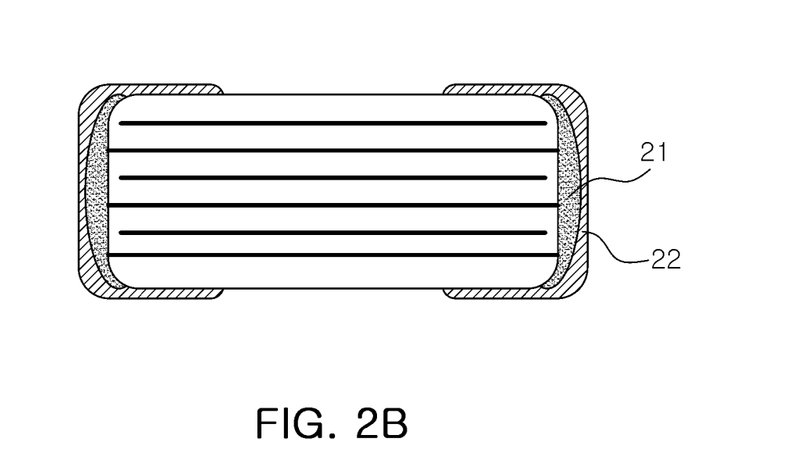

FIGS. 2A and 2B exemplarily illustrate formation configurations of an external electrode for a multilayered ceramic capacitor according to an embodiment of the present invention.

Referring to FIG. 2A, the first layer is formed on both ends of the multilayered ceramic capacitor in a length direction and extended onto side face portions adjacent thereto. On the other hand, the second layer is provided on the first layer and may be formed to cover both ends (of the capacitor) in the length direction.

Referring to FIG. 2B, the first layer is formed on both ends of the multilayered ceramic capacitor in a length direction, while the second layer is formed on both ends of the multilayered ceramic capacitor in the length direction and extended onto side faces adjacent thereto.

The present invention is not particularly limited to the foregoing configuration of the external electrode and may be modified to have various forms with the proviso that the external electrode completely seals the internal electrode.

The multilayered ceramic capacitor according to an embodiment of the present invention may be fabricated as follows.

First, a ceramic powder including barium titanate or the like as a main component is mixed with a binder, a dispersing agent, or the like in an organic solvent and the mixture is uniformly dispersed using a ball mill to prepare slurry. Then, the slurry is treated by a method, such as a doctor blade method or the like, to form a ceramic sheet.

A conductive metal such as Ni is mixed with a binder, a dispersing agent, or the like to prepare a Ni paste for an internal electrode and by using the Ni paste, an internal electrode pattern is formed on the ceramic sheet through screen printing.

A plurality of the ceramic sheets provided with the internal electrode pattern are laminated, compressed and cut, and then external electrodes are formed thereon. The external electrode may be formed using a paste including Cu as a main component through dipping.

According to the present embodiment, the external electrode may have two layers, that is, first and second layers.

The first and second layers may be substantially identical to each other, except that compositions of glass frits thereof are different.

EXAMPLES

Hereinafter, the present invention will be more clearly understood from the following examples.

After weighing and mixing start elements of a glass frit together to satisfy compositions listed in Table 1, the mixture was fused at 1,450° C. with a temperature elevation rate of 10° C./min and then rapidly cooled using a twin roller, resulting in glass flakes.

Then, dry milling and wet milling using alcohol were executed to prepare a glass frit.

The composition of the glass frit is listed in Table 1.

TABLE 1

| external electrode | | Second layer | First layer |
|---|---|---|---|
| Composition of glass | $SiO_2$ | 7 | 49 |
| | $B_2O_3$ | 24 | 19 |
| | $Al_2O_3$ | 5 | 0 |
| $TM_xO_y$ | ZnO | 28 | 1 |
| | $V_2O_5$ | 0 | 6 |

TABLE 1-continued

| external electrode | | Second layer | First layer |
|---|---|---|---|
| $AM_2O$ | $Li_2O$ | 0 | 15 |
| | $K_2O$ | 0 | 6 |
| | $Na_2O$ | 0 | 0 |
| AEMO | BaO | 28 | 3 |
| | CaO | 8 | 1 |

Table 2 shows the incidence of glass exudation faults and contact faults according to the Inventive Example and Comparative Examples. The Comparative Examples included the applying of an external electrode paste for a first or second layer ("first layer paste or second layer paste") once, to form an external electrode, while the Inventive Example included applying external electrode pastes for first and second layers, twice, to form an external electrode.

TABLE 2

| | Comparative Example 1 | Comparative Example 2 | Inventive Example |
|---|---|---|---|
| Application method | One application | One time application | Two time applications |
| Paste | First layer paste | Second layer paste | First and second layer pastes |
| Incidence of glass exudation fault | 13/100 | 0/100 | 0/100 |
| Incidence of contact fault | 1/100 | 23/100 | 0/100 |

Referring to Comparative Example 1 in Table 2, in the case in which the first layer paste was applied once to form an external electrode, the number of glass exudation faults was 13 cases among a total of 100 cases, whereas contact faults were not observed.

Referring to Comparative Example 2 in Table 2, in the case in which the second layer paste was applied once to form an external electrode, glass exudation faults did not occur but contact faults were 23 cases among a total of 100 cases.

Referring to the Inventive Example in Table 2, in the case in which the first layer paste was applied first and then the second layer paste was applied to the first layer to form an external electrode, neither glass exudation faults nor contact faults were observed.

Consequently, since an external electrode was formed to have two layers, that is, the first and second layers, both glass exudation and the contact faults may be prevented.

Figure 3A:
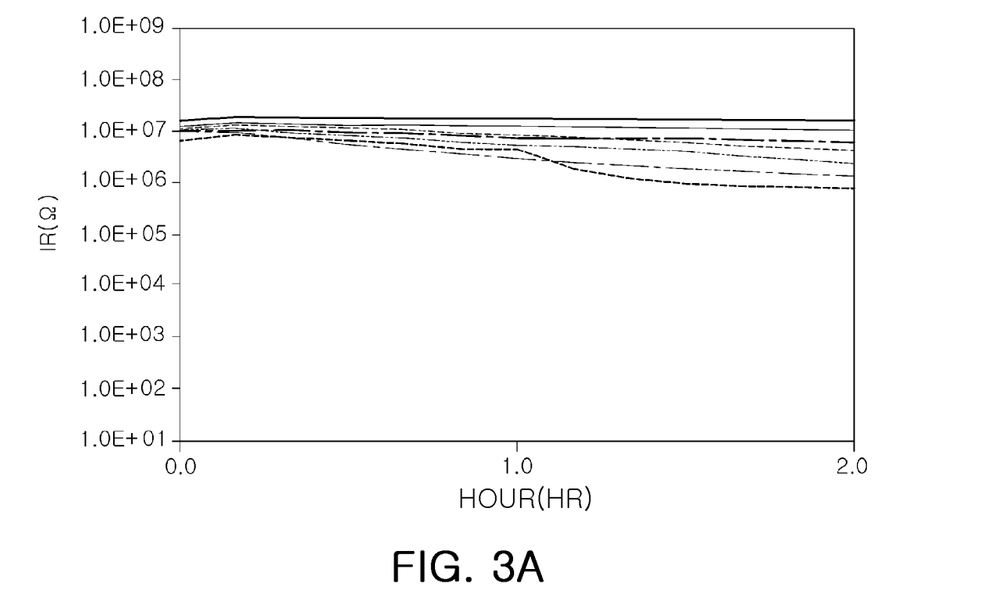
FIGS. 3A and 3B illustrate graphs showing results of insulation resistance measurement according to Inventive example and Comparative example.
Figure 3B:
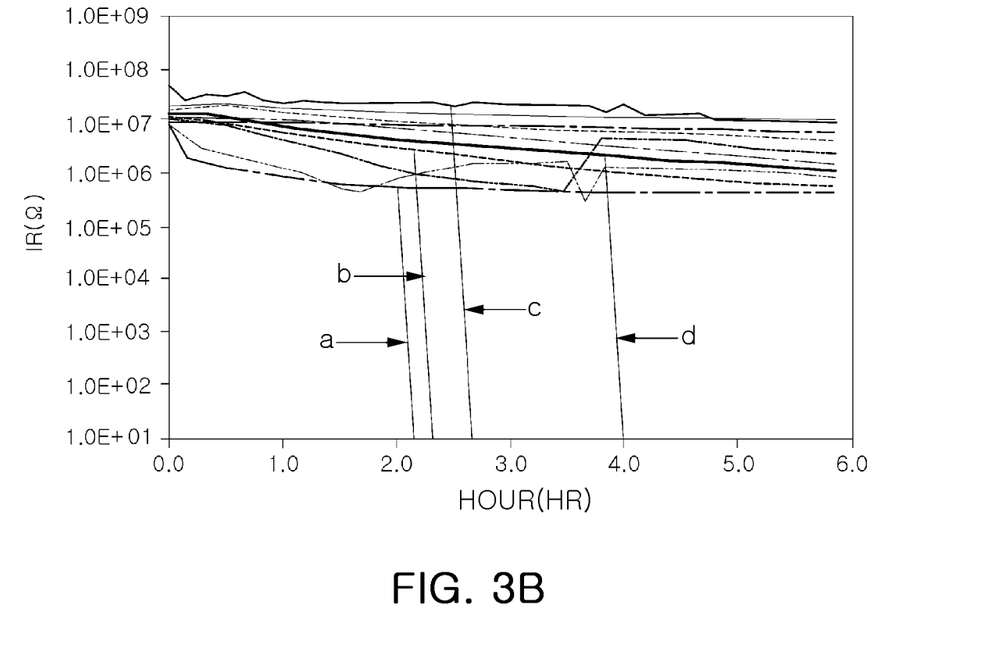

FIGS. 3A and 3B illustrate graphs showing results of insulation resistance measurement according to the Inventive example and the Comparative examples.

Referring to FIG. 3A, although the insulation resistance in the Inventive Example showed a tendency to slightly decrease over time, the tendency of the insulation resistance is generally favorable.

Referring to FIG. 3B, a decrease in insulation resistance in the Comparative Examples was relatively large, as compared to the Inventive Example. As indicated by a, b, c and d, the insulation resistance was suddenly lowered at times, which is considered to correspond to product faults caused by insulation breakdowns.

Figure 4:
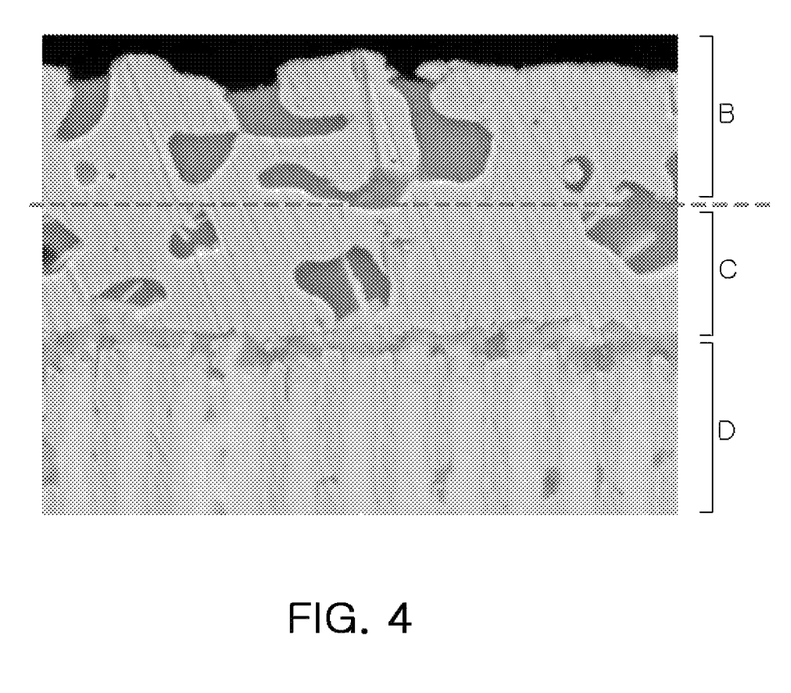
FIG. 4 is a photograph showing a cross-section configuration of an external electrode of a multilayered ceramic electronic component according to an embodiment of the present invention.

FIG. 4 is a photograph showing a cross-section of the external electrode formed according to the Inventive Example of the present invention. Part 'B' refers to the second layer, part 'C' refers to the first layer and part 'D' refers to the body.

Referring to FIG. 4, it can be seen that glass is uniformly distributed throughout the external electrode and a reaction layer of the glass and a ceramic is formed at an interface between the external electrode and the body.

That is, glass is uniformly distributed in the external electrode, whereby an occurrence of glass exudation may be prevented. In addition, since the reaction layer of the glass and ceramic is formed, it may be presumed that adhesion between the internal electrode and the external electrode is excellent.

As set forth above, the multilayered ceramic electronic component according to the embodiments of the present invention has excellent adhesion between an internal electrode and an external electrode and excellent acid-resistance to a plating solution, whereby glass exudation may be prevented. Moreover, the multilayered ceramic electronic component according to the embodiments of the present invention may exhibit high sealing effect to the outside, thus having excellent moisture resistance.

While the present invention has been shown and described in connection with the embodiments, it will be apparent to those skilled in the art that modifications and variations can be made without departing from the spirit and scope of the invention as defined by the appended claims.

What is claimed is:

1. A multilayered ceramic electronic component, comprising:
a body formed by alternately laminating a ceramic layer and an internal electrode layer; and
an external electrode provided on one surface of the body, wherein the external electrode includes:
a first layer formed on one surface of the body to contact the internal electrode and containing a conductive metal and a first glass frit represented by a formula of $aSiO_2$-$bB_2O_3$-cAEMO (where, a+b+c=100, 'a' ranges from 20 to 60, 'b' ranges from 5 to 40, 'c' ranges from 1 to 30, in terms of parts by mole, and AEM denotes an alkali-earth metal selected from a group consisting of barium and calcium); and
a second layer formed on the first layer, having a plated layer formed on a surface thereof, and containing a conductive metal and a second glass frit represented by a formula of $aSiO_2$-$bB_2O_3$-cAEMO (where, a+b+c=100, 'a' ranges from 5 to 19, 'b' ranges from 10 to 40, 'c' ranges from 5 to 40, in terms of parts by mole, and AEM denotes an alkali-earth metal selected from a group consisting of barium and calcium),
wherein the first layer is formed of a conductive paste including 100 parts by weight of the conductive metal and 5 to 15 parts by weight of the first glass frit, and
the second layer is formed of a conductive paste including 100 parts by weight of the conductive metal and 10 to 20 parts by weight of the second glass frit.

2. The multilayered ceramic electronic component of claim 1, wherein the first glass frit further includes at least one selected from a group consisting of up to and including 10 parts by mole of $Al_2O_3$, up to and including 30 parts by mole of $TM_xO_y$, and up to and including 40 parts by mole of $AM_2O$ (where, TM is at least one transition metal selected from a group consisting of vanadium and zinc, x and y are atomic ratios of the at least one transition metal and oxygen in a transition metal oxide, AM is an alkaline metal selected from a group consisting of lithium, sodium and potassium), and
wherein the second glass frit further includes at least one selected from a group consisting of up to and including 10 parts by mole of $Al_2O_3$, up to and including 10 parts by mole of $TM_xO_y$, and up to and including 20 parts by mole of $AM_2O$ (where, TM is at least one transition metal selected from a group consisting of vanadium and zinc, x and y are atomic ratios of the at least one transition metal and oxygen in a transition metal oxide, and AM is an alkaline metal selected from a group consisting of lithium, sodium and potassium).

3. The multilayered ceramic electronic component of claim 1, wherein the conductive metal is copper.

4. The multilayered ceramic electronic component of claim 1, wherein the ceramic layer is a dielectric layer.

5. The multilayered ceramic electronic component of claim 1, wherein the internal electrode is made of nickel.

* * * * *